Figure 1:
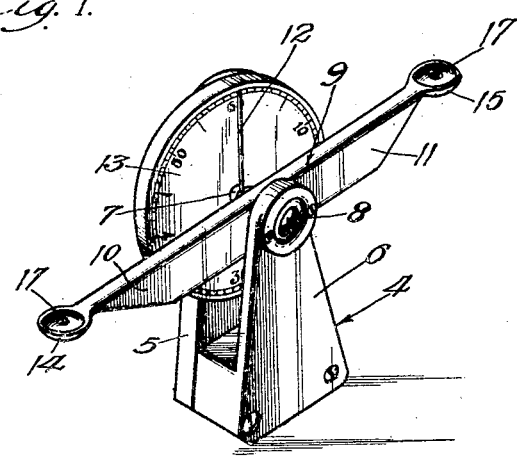

W. F. BACHMAN.
BALANCE.
APPLICATION FILED SEPT. 13, 1919.

1,354,275.

Patented Sept. 28, 1920.

Witness:
Stephen T. Rebora

Inventor:
William F. Bachman

UNITED STATES PATENT OFFICE.

WILLIAM F. BACHMAN, OF CHICAGO, ILLINOIS.

BALANCE.

1,354,275.

Specification of Letters Patent.   Patented Sept. 28, 1920.

Application filed September 13, 1919.   Serial No. 323,568.

*To all whom it may concern:*

Be it known that I, WILLIAM F. BACHMAN, a citizen of the United States, residing at Chicago, in the county of Cook and State of Illinois, have invented certain new and useful Improvements in Balances, of which the following is a specification.

The present invention has to do with improvements in balances or the like; that is, instruments for comparing the weights of articles by balancing the one against the other. The invention has particular reference to improvements in the construction of balances intended for comparing very light or delicate articles, such as the timing screws of balance wheels for watches and the like. These screws are extremely light, some of them weighing only a fraction of a gram, and, therefore, any balance for comparing them must be correspondingly delicate, and accurate in its operations.

The instrument to which the present invention relates is intended particularly for comparing articles such as those above mentioned, although its usefulness is not limited to this particular work. However, since it is particularly intended for comparing the timing screws for balance wheels, I will explain the instrument with particular reference to its usefulness for this work.

The timing of the balance wheel is adjusted by increasing or decreasing the weight on the periphery of the wheel, and this is generally done by the use of screws of different weights. When the wheel is to be slowed down, heavier screws are to be inserted, and, on the contrary, if the balance wheel is to be speeded up, the heavier screws should be removed and lighter ones substituted. In any case, however, the screws should be balanced on the two sides of the wheel, so that it will be in perfect balance with respect to its pivotal center. It sometimes happens that one or more screws will become lost from the periphery of the balance wheel, so that it becomes necessary to substitute other screws in order to restore the wheel to balance, and in order to properly time it.

The present scale is for the purpose of comparing these delicate screws, so that screws of exactly the same weight may be used in the different portions of the wheel.

Figure 2:
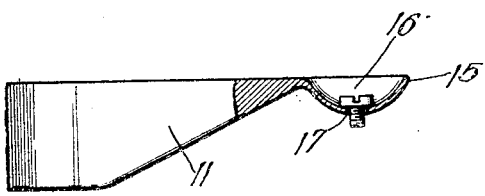

In the drawings:

Figure 1 shows a perspective view of an instrument embodying the features of the present invention; and Fig. 2 shows an enlarged detail fragmentary side elevation of the balance arms, the cup being shown in section so as to show the manner in which the screw sets into the cup during the comparing operations.

I will state that both of the figures in the drawing are on very greatly enlarged scale since the completed instrument is ordinarily only about an inch in overall direction between the two cups.

The instrument includes a base portion 4 which is relatively heavy and substantial and is provided with the standards 5 and 6. Across the upper portions of said standards there extends a shaft or pin 7 which is journaled in the upper ends of the standards by jewels such as 8, in the usual and well understood manner. On the shaft or pin 7 is a cross beam 9 having the arms 10 and 11. The shaft 7 also carries a pointer 12 which works over the face of a scale 13 having suitable graduations, so that the condition of balance or the amount of unbalance of the beam 9 may be readily indicated on said scale.

At the ends of the arms 10 and 11 are the cups 14 and 15 in which the screws or other articles to be compared are set. The beam 9 and the cups are made of any suitable material, but aluminum is found very satisfactory for this purpose, since it is light and of sufficient strength to hold its form, and can be readily worked into the desired shape.

Each of the cups 14 and 15 is provided with a dish-shaped or hollow recess 16 into which the article may be set. Since the screws to be compared are themselves of very light weight, and since the instrument is very delicate in its indications, it follows that in order to secure an exact comparison it is necessary to have the screws exactly centered in their respective cups at the time the comparison is made. If the screws were simply laid in the cups, it would be evident that a condition of balance or unbalance indicated by the pointer 12 might or might not indicate correctly the comparison between the screws, depending entirely upon the manner in which the screws are laid into the cups. If the screws were laid into the cups with their centers of gravity the same distance from the pivotal point of the beam, and if the pointer thus indicated a condition of balance, there would be assurance that the screws were of the same weight. If, however, the centers of gravity of the two screws were not the same distance from the pivotal centers of the beam, the comparison would be false as far as any accuracy of result is concerned.

I have, therefore, so constructed the cups that the screws may be set into them with definite assurance that their centers of gravity will be exactly the same distance from the pivotal center of the beam. For this purpose, I have provided a perforation or opening 17 in the center portion of each cup, which perforations or recesses are for the accommodation of the shanks of their respective screws. By setting screws into the cups in the manner indicated in Fig. 2 with the shank of the screw depending into or through the perforation or recess, assurance is had that the screw is exactly centered and has its center of gravity the exact correct distance from the pivotal point of the beam.

While I have herein shown and described only a single embodiment of the features of my invention, still I do not limit myself to the same, except as I may do so in the claims.

I claim:

1. A balance for the purpose specified comprising a beam, a pivotal mounting in the central portion of the same, a pointer in conjunction with said pivotal mounting, and a scale in conjunction with said pointer for showing the condition of balance or unbalance of the beam, there being a concave cup on each end of the beam, said cups being located equidistant from the pivotal center of the beam, and each cup having its concavity facing upwardly and being provided in the lower central portion of its concavity with a downwardly extending perforation or recess for the accommodation of the shank of a screw under test, substantially as described.

2. A balance for the purpose specified comprising a beam, a pivotal mounting for the same, and means in conjunction with said beam for showing the condition of balance or unbalance thereof, there being a concave cup on each end of the beam, said cups being located equidistant from the pivotal center of the beam, and each cup having in the lower portion of its concavity a downwardly extending recess or perforation for the accommodation of the shank of a screw under test, substantially as described.

WILLIAM F. BACHMAN.